United States Patent
Souda et al.

(10) Patent No.: US 9,567,244 B2
(45) Date of Patent: Feb. 14, 2017

(54) DRAINAGE OF AN AQUEOUS COMPOSITION

(75) Inventors: Tatsuo Souda, Ichihara (JP); Jianren Zeng, Chuo-ku (JP); Sung-Hsuen Chao, Seneffe (BE); Serge Creutz, Liege (BE); Alain Hilberer, Recquignies (FR); Corina Pagnoni, La Louviere (BE); Fabian Rouffiange, Tubize (BE); Haruhiko Furukawa, Chuo-ko (JP)

(73) Assignees: DOW CORNING TORAY CO., LTD., Chiyoda-Ku, Tokyo (JP); DOW CORNING CORPORATION, Midland, MI (US)

( * ) Notice: Subject to any disclaimer, the term of this patent is extended or adjusted under 35 U.S.C. 154(b) by 100 days.

(21) Appl. No.: 14/342,266

(22) PCT Filed: Aug. 23, 2012

(86) PCT No.: PCT/EP2012/003562
§ 371 (c)(1),
(2), (4) Date: Nov. 20, 2014

(87) PCT Pub. No.: WO2013/029764
PCT Pub. Date: Mar. 7, 2013

(65) Prior Publication Data
US 2015/0059102 A1    Mar. 5, 2015

(30) Foreign Application Priority Data
Sep. 2, 2011    (GB) .................................. 1115161.0

(51) Int. Cl.
C11D 3/12    (2006.01)
C02F 1/54    (2006.01)
(Continued)

(52) U.S. Cl.
CPC ................. C02F 1/547 (2013.01); C02F 1/56 (2013.01); C11D 3/3738 (2013.01);
(Continued)

(58) Field of Classification Search
CPC ............. D21C 9/02; D21C 9/18; D21C 9/086; C11D 3/3738; C11D 11/0017; D21H 17/59; D21H 21/10; C02F 1/545; C02F 2103/002; C02F 2103/28; C02F 2307/12
(Continued)

(56) References Cited

U.S. PATENT DOCUMENTS 4,290,896 A * 9/1981 Gordon .................. C02F 1/545
                                              209/5
4,525,279 A    6/1985 Cooper
5,510,439 A    4/1996 Shetty et al.

FOREIGN PATENT DOCUMENTS

EP    0 636 685 A2    2/1995
EP    0 957 198 A1    11/1999
(Continued)

OTHER PUBLICATIONS

STIC Search Report dated Mar. 1, 2016.*
(Continued)

*Primary Examiner* — Eisa Elhilo
(74) *Attorney, Agent, or Firm* — Howard & Howard Attorneys PLLC (57) ABSTRACT

In a process for separating a solid material from a suspension of the solid material in water, an organopolysiloxane polyalkylene oxide copolymer comprising a branched organopolysiloxane structure is added to the suspension of solid material in water and the suspension is drained. The organopolysiloxane polyalkylene oxide copolymer comprising a branched organopolysiloxane structure increases the rate of drainage of the suspension.

16 Claims, 1 Drawing Sheet

(51) Int. Cl.

| | |
|---|---|
| *C02F 1/56* | (2006.01) |
| *C11D 3/37* | (2006.01) |
| *C11D 11/00* | (2006.01) |
| *D21C 9/02* | (2006.01) |
| *D21C 9/08* | (2006.01) |
| *D21H 17/59* | (2006.01) |
| *D21H 21/10* | (2006.01) |
| *D21C 9/18* | (2006.01) |
| *C02F 11/14* | (2006.01) |
| *C02F 103/00* | (2006.01) |
| *C02F 103/28* | (2006.01) |
| *C08G 77/12* | (2006.01) |
| *C08G 77/46* | (2006.01) |
| *C02F 103/10* | (2006.01) |

(52) U.S. Cl.
CPC ............ *C11D 11/0017* (2013.01); *D21C 9/02* (2013.01); *D21C 9/086* (2013.01); *D21C 9/18* (2013.01); *D21H 17/59* (2013.01); *D21H 21/10* (2013.01); *C02F 1/545* (2013.01); *C02F 11/14* (2013.01); *C02F 2103/002* (2013.01); *C02F 2103/10* (2013.01); *C02F 2103/28* (2013.01); *C02F 2305/04* (2013.01); *C02F 2307/12* (2013.01); *C08G 77/12* (2013.01); *C08G 77/46* (2013.01)

(58) Field of Classification Search
USPC .............................................. 8/137; 510/710
See application file for complete search history.

(56) References Cited

FOREIGN PATENT DOCUMENTS

| | | |
|---|---|---|
| EP | 0 995 473 A1 | 4/2000 |
| FR | 1 314 836 A | 1/1963 |
| JP | 2001-353407 A | 12/2001 |
| JP | 2006-320837 A | 11/2006 |
| WO | WO 01/16265 A2 * | 3/2001 ............... C11D 3/00 |

OTHER PUBLICATIONS

International Search Report for Application No. PCT/EP2012/003562 dated May 3, 2013, 6 pages.

Machine-Assisted English translation for FR 1 314 836 extracted from espacenet.com database on Jun. 12, 2014, 17 pages.

English language abstract and machine-assisted English translation for JP 2001-353407 extracted from the PAJ database on Jun. 12, 2014, 71 pages.

English language abstract and machine-assisted English translation for JP 2006-320837 extracted from the PAJ database on Jun. 12, 2014, 34 pages.

\* cited by examiner

DRAINAGE OF AN AQUEOUS COMPOSITION

RELATED APPLICATIONS

This application is the National Stage of International Patent Application No. PCT/EP2012/003562, filed on Aug. 23, 2012, which claims priority to and all the advantages of Great Britain Patent Application No. GB 1115161.0, filed on Sep. 2, 2011, the contents of which are incorporated herein by reference.

Disclosed herein is a use and a process for improving the drainage of a solid material from an aqueous medium, for example the drainage of a fibrous cellulosic material such as a wood pulp slurry. The disclosure, in particular, relates to the use of an organopolysiloxane polyalkylene oxide copolymer to improve the drainage of a solid material from an aqueous medium.

Drainage and dewatering is an important aspect in many processes involving removal of water from a dispersion of solid material. Better and faster removal of the water (drainage) results in cleaner solid and less energy for subsequent drying. In pulp and paper application, improved drainage in the pulp washing results in a cleaner pulp that requires decreased usage of bleaching chemicals and allows reduced fresh water consumption and drying energy.

EP-A-957198 describes the use of an oxyalkylene-modified organopolysiloxane, in combination with an alkylated sulfonated diphenyloxide surfactant, as a chemical pulping additive. Wood chips, an aqueous cooking liquor and the oxyalkylene-modified organopolysiloxane and alkylated sulfonated diphenyloxide surfactant are heated at a temperature of at least 150° C. under pressure. Branched oxyalkylene-modified organopolysiloxanes are described as not as cost effective as oxyalkylene-modified organopolysiloxanes based on a linear organopolysiloxane.

We have found that branched silicone polyethers provide improved drainage performance of aqueous suspensions of solid material compared to their counterpart linear silicone polyethers. By improved drainage we mean an increased rate of water removal from a suspension.

In a process according to the disclosure for separating a solid material from a suspension of the solid material in water, an organopolysiloxane polyalkylene oxide copolymer comprising a branched organopolysiloxane structure is added to the suspension of solid material in water and the suspension is drained, whereby the organopolysiloxane polyalkylene oxide copolymer comprising a branched organopolysiloxane structure increases the rate of drainage of the suspension.

Use according to the disclosure of an organopolysiloxane polyalkylene oxide copolymer for improving the drainage of a suspended solid material from an aqueous medium is characterised in that the organopolysiloxane polyalkylene oxide copolymer comprises a branched organopolysiloxane structure.

The process disclosed herein is particularly advantageous in the drainage of aqueous suspensions of fibrous cellulosic material such as wood pulp slurries, for example a wood pulp slurry formed in pulp brownstock washing. In a process disclosed herein for producing dry washed wood pulp by washing wood pulp in an aqueous slurry and draining and drying the washed wood pulp slurry, an organopolysiloxane polyalkylene oxide copolymer comprising a branched organopolysiloxane structure is added to the aqueous slurry before draining, thereby increasing the rate of drainage of the wood pulp slurry and reducing the total energy used in draining and drying the slurry. The process disclosed herein is also advantageous in the drainage of a papermaking wood pulp slurry for making paper or tissues, or of a pulp slurry formed in recycling of fibrous material.

A further example of a fibrous material where the branched organopolysiloxane polyalkylene oxide copolymer gives advantages in draining is a textile material, particularly a cellulosic textile material, for example garments made of cotton or regenerated cellulose fibre fabric. The branched organopolysiloxane polyalkylene oxide copolymer can be incorporated in a laundry process for washing and rinsing textiles, particularly cellulosic textiles to give improved drainage, or can be added to a slurry of cellulosic or other textile fibres to improve drainage at any stage of the textile manufacturing process.

Further examples of suspended solid materials where the branched organopolysiloxane polyalkylene oxide copolymer can give improved drainage are coal and other minerals, and sewage sludge. The branched organopolysiloxane polyalkylene oxide copolymer gives improved drainage of a suspension of fine coal such as that produced during coal washing. The branched organopolysiloxane polyalkylene oxide copolymer also gives improved drainage of sludge in the settling process of a sewage plant.

The branched organopolysiloxane structure can be a structure in which 3 or 4 polysiloxane moieties extend from a silicon atom in the organopolysiloxane, or can be a structure in which branching is achieved by partially cross-linking organopolysiloxane chains. The crosslinking moiety may incorporate siloxane units or may have an organic backbone. The organopolysiloxane structure is regarded as branched if there is at least one silicon atom in the organopolysiloxane from which at least 3 organopolysiloxane moieties, or organic groups substituted by an organopolysiloxane moiety, extend.

The branched organopolysiloxane polyalkylene oxide copolymer preferably has the general formula $$R_2R^*SiO(RR'SiO)_x(R_2SiO)_y(RR''SiO)_zSi R_2R^* \qquad (I)$$

wherein each R represents a hydrocarbon group having 1 to 25 carbon atoms; each R' represents a polyoxyalkylene group of the formula $$-A-O-(A'-O)_w-(C_2H_4O)_a(C_3H_6O)_b(C_4H_8O)_c-R^2$$

wherein A represents a divalent hydrocarbon group having 1 to 20 carbon atoms or an acylalkyl group of the formula -A"C(O)— where A" is an alkylene group having 2 to 4 carbon atoms, or a direct bond, A' represents an alkylene group having 2 to 5 carbon atoms, $R^2$ represents a hydrogen atom, an alkyl group having 1 to 6 carbon atoms or an acyl group having 1 to 6 carbon atoms, w=0 or 1, a=0-50, b=0-50 and c=0-20, provided that a+b+c is at least 1; each R" represents an organopolysiloxane moiety or an organic group substituted by an organopolysiloxane moiety and is bonded to Si by a Si—C bond or a siloxane linkage; each R* is a R, R' or R" group; x=1-40; y=0-300; and z=1-5.

Each R" moiety can form a branching point in one of a variety of different ways. The (RR"SiO) unit can for example be a T-unit of the formula $RSiO_{3/2}$, in which the R" moiety is an organopolysiloxane moiety, optionally substituted by one or more polyoxyalkylene group, bonded to Si by a siloxane linkage. In a preferred example the (RR"SiO) unit can be derived from a Si—H functional siloxane unit RHSiO by hydrosilylation. A Si—H functional polysiloxane can for example be hydrosilylated with an organic or silicone compound containing at least two ethylenic groups to form a crosslinked structure having branching points at (RR"SiO) units. Alternatively a Si—H functional polysiloxane can be hydrosilylated with an organopolysiloxane containing an ethylenic group to form a branched structure. An organopolysiloxane containing pendant reactive organic functional groups can be partially crosslinked by reaction of the reactive organic functional groups.

The branched organopolysiloxane polyalkylene oxide copolymer can for example be derived from a polysiloxane having a plurality of Si—H groups such as a poly(alkylhydrogensiloxane), for example a poly(methylhydrogensiloxane), or an alkylhydrogensiloxane dialkylsiloxane copolymer, for example a methylhydrogensiloxane dimethylsiloxane copolymer. The polysiloxane having a plurality of Si—H groups can be reacted with an ethylenically unsaturated compound in the presence of a catalyst for the hydrosilylation reaction, such as a platinum group compound.

The siloxane units of the formula (RR'SiO) can be formed by reaction of the polysiloxane having a plurality of Si—H groups with a polyether containing an ethylenically unsaturated group. The siloxane units of the formula (RR"SiO) can be formed by reaction of the polysiloxane having a plurality of Si—H groups with an organic or organosiloxane compound having at least two ethylenically unsaturated groups, or with a polysiloxane having at least one ethylenically unsaturated group. The siloxane units of the formula ($R_2$SiO) can for example be dialkyl groups present in a alkylhydrogensiloxane dialkylsiloxane copolymer reagent, or can be formed by reaction of the polysiloxane having a plurality of Si—H groups with a 1-alkene.

The polyether containing an ethylenically unsaturated group which is reacted with the polysiloxane having a plurality of Si—H groups can for example be a monoallylether of a polyoxyalkylene glycol having the formula where a, b, c and $R^2$ are defined as above. The polyether group is preferably hydroxy-terminated, that is the group $R^2$ represents a hydrogen atom. Each —($C_2H_4$O)— unit is generally an oxyethylene unit of the formula —$CH_2CH_2$O—. Each —($C_3H_6$O)— unit is preferably an oxypropylene unit of the formula —$CH_2$CH($CH_3$)O—. Each —($C_4H_8$O)— unit may for example be a $CH_2$CH($CH_2CH_3$) unit or a —($CH_2$)$_4$O— unit.

The polyether containing an ethylenically unsaturated group can alternatively be an acrylate or methacrylate ester of a polyoxyalkylene glycol, for example an acrylate ester having the formula where A', w, a, b, c and $R^2$ are defined as above, or a corresponding methacrylate ester.

Although all the branched organopolysiloxane polyalkylene oxide copolymers generally show improved drainage performance compared to an organopolysiloxane polyalkylene oxide copolymer which does not have a branched organopolysiloxane structure, we have found that the branched organopolysiloxane polyalkylene oxide copolymers in which the polyalkylene oxide moiety is polypropylene oxide rich give the greatest improvement in drainage performance. In formula (I) above, b is preferably from at least 5, most preferably from at least 10, up to 40 or 50 and b is preferably at least equal to a and most preferably greater than a.

The organic or organosiloxane compound having at least two ethylenically unsaturated groups which is reacted with the polysiloxane having a plurality of Si—H groups can for example be a compound of the formula $CH_2$=$CR^3$—Y—$CR^3$=$CH_2$, wherein each $R^3$ represents hydrogen or an alkyl group having 1 to 3 carbon atoms and Y represents an organic or organosiloxane linkage which contains no hydrolysable bonds. Preferably each $R^3$ represents hydrogen. The organic groups represented by Y may include for example C1 to C10 alkylene radicals such as methylene, dimethylene, triethylene, pentamethylene and decamethylene; cycloalkylene radicals such as cyclohexylene; divalent aromatic radicals such as p-phenylene or o-phenylene; and oxygen containing radicals such as —COO—$CH_2CH_2$—OOC— and —$CH_2$—O—$CH_2$—.

The organic compound having at least two ethylenically unsaturated groups can for example be an α,ω-diolefin such as an α,ω-diene of the formula $CH_2$=CH($CH_2$)$_d$CH=$CH_2$ where d is 1-14. Some representative examples of suitable α,ω-dienes for use herein are 1,4-pentadiene; 1,5-hexadiene; 1,6-heptadiene; 1,7-octadiene; 1,8-nonadiene; 1,9-decadiene; 1,11-dodecadiene and 1,13-tetradecadiene. Such organic compounds having a chain of carbon-carbon bonds are preferred, but the organic compound can alternatively be a cyclic compound such as 2,5-norbornadiene or divinylcyclohexane or can contain a non-hydrolysable heteroatom linkage such as an ether linkage. The organic compound can for example be a diallyl ether of a polyol such as trimethylolpropane diallyl ether. For many purposes ester linkages may be sufficiently resistant to hydrolysis; for example the organic compound can be divinyl succinate. The organic compound having at least two ethylenically unsaturated groups may itself be a polyether; it can for example be a diallyl ether of a polyoxyalkylene glycol. Polyoxyalkylenes having an unsaturated aliphatic hydrocarbon group at each molecular terminal are commercially available from NOF (Nippon Oil and Fat, Tokyo, Japan) and Clariant Corp. (Charlottesville, N.C.). Representative non-limiting examples include Uniox DMUS-5 having the formula $CH_2$=C($CH_3$)$CH_2$O($C_2H_4$O)$_{13}$$CH_2$C($CH_3$)=$CH_2$ and Polycerin 50DMUS-60 having the formula $CH_2$=C($CH_3$)$CH_2$O($C_2H_4$O)$_{10}$($C_3H_6$O)$_{7.6}$$CH_2$C($CH_3$)=$CH_2$, both available from NOF America Corporation (White Plains, N.Y.). 1,2,4-trivinylcyclohexane, 1,2,5-trivinylcyclohexane and triallyl isocyanurate are examples of suitable organic compounds having more than two ethylenically unsaturated groups which can be reacted with the polysiloxane having a plurality of Si—H groups.

The organosiloxane compound having at least two ethylenically unsaturated groups is preferably a vinyl terminated organopolysiloxane having a chain of 2 or more, for example 2 to 400 siloxane units. We have found that organopolysiloxane polyalkylene oxide copolymers branched by partial crosslinking of an organopolysiloxane containing Si—H groups with a vinyl terminated organopolysiloxane having a chain of at least 50, for example 50 to 200 siloxane units, are particularly effective in improving drainage.

The hydrocarbon groups represented by R in formula (I) can in general include any of the saturated or unsaturated open-chain hydrocarbon groups, or can be cycloalkyl or aryl groups. Saturated hydrocarbon groups are preferred such as, for example, methyl, ethyl, propyl, hexyl, decyl, dodecyl, octadecyl, and eicosyl. In many cases the majority of the groups R are methyl groups. For example, when the branched organopolysiloxane polyalkylene oxide copolymer is prepared by reaction of a polysiloxane having a plurality of methylhydrogensiloxane units with a polyether containing an ethylenically unsaturated group and an organic or organosiloxane compound having at least two ethylenically unsaturated groups, all the groups R in the (RR'SiO) and (RR"SiO) units are generally methyl groups. The ($R_2SiO$) units if present are usually dimethylsiloxane units present in a methylhydrogensiloxane dimethylsiloxane copolymer reagent, or are methylalkylsiloxane units such as methylethylsiloxane or methylhexylsiloxane units formed by reaction of methylhydrogensiloxane units with a 1-alkine. It is preferred that the majority of the groups R are methyl groups; the average number of carbon atoms in the groups R of the organopolysiloxane polyalkylene oxide copolymer is preferably less than 2.

The reaction of a polysiloxane having a plurality of Si—H groups with a polyether containing an ethylenically unsaturated group and an organic or organosiloxane compound having at least two ethylenically unsaturated groups can for example produce a branched organopolysiloxane polyalkylene oxide copolymer having the general formula wherein R, R*, R', x, y and z are as defined in claim 2; each $R^3$ represents hydrogen or an alkyl group having 1 to 3 carbon atoms and Y represents an organic or organosiloxane linkage which contains no hydrolysable bonds. In this structure, the group R" of the branched organopolysiloxane polyalkylene oxide copolymer has the formula Such an organopolysiloxane polyalkylene oxide copolymer is branched by partial crosslinking.

In general the polysiloxane having a plurality of Si—H groups can be reacted with the polyether containing an ethylenically unsaturated group, the organic or organosiloxane compound having at least two ethylenically unsaturated groups, and the 1-alkene if used, in any order or can be reacted with all of these simultaneously. The polysiloxane having a plurality of Si—H groups can for example contain from 5 to 100 methylhydrogensiloxane units. Each reaction is generally carried out in the presence of a Group VIII transition metal, particularly platinum, hydrosilylation catalyst. One preferred platinum catalyst is a platinum divinyl tetramethyl disiloxane complex typically containing about one weight percent of platinum in a solvent such as toluene.

Another preferred platinum catalyst is a reaction product of chloroplatinic acid and an organosilicon compound containing terminal aliphatic unsaturation. The noble metal catalysts is preferably used in amounts from 0.00001-0.5 parts per 100 weight parts of the ≡SiH containing polysiloxane, most preferably 0.00001-0.002 parts. The reaction can for example be carried out in dispersion in a non-reactive liquid organic or silicone material at elevated temperature, for example in the range 50-120° C.

In one preferred procedure the organic or organosiloxane compound having at least two ethylenically unsaturated groups is first added to the polysiloxane having a plurality of Si—H groups along with a suitable hydrosilylation catalyst, and is heated to effect reaction. The polyether containing an ethylenically unsaturated group may be reacted next. The polyether can be added to the reaction vessel and reacted in the presence of the appropriate hydrosilylation catalyst and heat.

In this procedure, during the reaction of the organic or organosiloxane compound having at least two ethylenically unsaturated groups with the polysiloxane having a plurality of Si—H groups, the Si—H groups are in molar excess with relation to the ethylenically unsaturated groups to ensure that sufficient Si—H groups remain for reaction with a polyether containing an ethylenically unsaturated group to introduce polyoxyalkylene groups, and to avoid crosslinking to such an extent that a gel is formed. It is usually preferred that the polysiloxane having a plurality of Si—H groups is in molar excess with relation to the organic or organosiloxane compound having at least two ethylenically unsaturated groups. The molar ratio of the polysiloxane having a plurality of Si—H groups to the organic or organosiloxane compound having at least two ethylenically unsaturated groups can for example be in the range 1:0.1 to 1:0.35. The molar ratio of Si—H groups to ethylenically unsaturated groups in this stage of the reaction can for example be 1:0.02 to 1:0.07.

Reaction at these molar ratios usually will not result in all of the Si—H functional polysiloxane becoming crosslinked. We have however found that the reaction product of a crosslinking reaction in these ratios, after further reaction to introduce polyoxyalkylene groups, is very effective in improving drainage and is significantly more effective than the non-branched organopolysiloxane polyalkylene oxide copolymer formed from the same polysiloxane having a plurality of Si—H groups and the same polyether containing an ethylenically unsaturated group.

Thus the branched organopolysiloxane polyalkylene oxide copolymer can be present as part of a composition also containing organopolysiloxane polyalkylene oxide copolymer having the general formula $$R_2R^*SiO(RR'SiO)_x(R_2SiO)_y(RR"SiO)_zSi R_2R^* \qquad (I)$$

in which R, R', R", R*, x and y are as defined in claim 2 and z=0, the average value of z in the total organopolysiloxane polyalkylene oxide copolymer in the composition being in the range 0.1 to 2.

The molar ratio of the polyether containing an ethylenically unsaturated group to Si—H groups of the polysiloxane having a plurality of Si—H groups can be less than, equal or greater than 1:1. If the Si—H groups are in excess at this stage of the reaction, it may be preferred to react the product with a 1-alkene to avoid reactive Si—H groups in the branched organopolysiloxane polyalkylene oxide copolymer. If the ethylenically unsaturated groups of the polyether are in excess, the product may contain unreacted polyether containing an ethylenically unsaturated group, but this is usually not detrimental in the branched organopolysiloxane polyalkylene oxide copolymer composition.

If methylalkylsiloxane units are formed by reaction of methylhydrogensiloxane units with a 1-alkene, part of the 1-alkene reagent can be reacted with the polysiloxane having a plurality of Si—H groups before reaction with the compound having at least two ethylenically unsaturated groups and the polyether containing an ethylenically unsaturated group. This portion of the aliphatic radical precursor which is reacted first is much less than a stoichiometric amount in order to be certain that sufficient silicon hydride reaction sites remain for the addition of the cross linking agent and the polyoxyalkylene. The remainder of the 1-alkene reagent, if used, is added to the reaction vessel after reaction with the compound having at least two ethylenically unsaturated groups and the polyether containing an ethylenically unsaturated group and reacted in the presence of hydrosilation catalyst and heat. At this stage the 1-alkene reagent may be in stoichiometric excess in relation to the remaining siloxane hydride reaction sites.

The siloxane units of the formula (RR"SiO) can alternatively be formed by reaction of the polysiloxane having a plurality of Si—H groups with a polysiloxane having at least one ethylenically unsaturated group instead of an organic or organosiloxane compound having at least two ethylenically unsaturated groups. The procedure for forming the branched organopolysiloxane polyalkylene oxide copolymer is generally as described above. When a polysiloxane having one ethylenically unsaturated group is reacted, the copolymer formed is branched but not crosslinked.

The polysiloxane having a plurality of Si—H groups is usually a linear polysiloxane but can be a polysiloxane in which the Si—H groups are present in cyclotetrasiloxane or cyclopentasiloxane rings. For example the polysiloxane having a plurality of Si—H groups can be of the formula where n=2-300. Such a cyclic Si—H functional polysiloxane can be reacted with a polyether containing an ethylenically unsaturated group, an organic or organosiloxane compound having at least two ethylenically unsaturated groups or a polysiloxane having one ethylenically unsaturated group, and optionally a 1-alkene using the procedures described above. The branched organopolysiloxane polyalkylene oxide copolymer produced can for example have the general formula wherein R is defined as in claim 2; each $R^5$ represents a hydrocarbon group having 1 to 25 carbon atoms, a polyoxyalkylene group of the formula -A-O-(A'-O)$_w$—(C$_2$H$_4$O)$_a$(C$_3$H$_6$O)$_b$(C$_4$H$_8$O)$_c$—R$^2$ wherein A represents a divalent hydrocarbon group having 1 to 20 carbon atoms or an acylalkyl group of the formula -A"C(O)— where A" is an alkylene group having 2 to 4 carbon atoms, A' represents an alkylene group having 2 to 5 carbon atoms, $R^2$ represents a hydrogen atom, an alkyl group having 1 to 6 carbon atoms or an acyl group having 1 to 6 carbon atoms, w=0 or 1, a=0-50, b=0-50 and c=0-20, provided that a+b+c is at least 1, or an organopolysiloxane moiety, optionally substituted by one or more polyoxyalkylene group, bonded to Si by a Si—C bond, provided that at least one group $R^5$ represents a polyoxyalkylene group and at least one group $R^5$ represents an organopolysiloxane moiety; n=1-400; and each q=1 or 2.

An organopolysiloxane polyalkylene oxide copolymer branched by partial crosslinking can alternatively be formed by the reaction of an organopolysiloxane containing pendant reactive organic functional groups with a crosslinking reagent having at least one group, and preferably at least two groups, which react with the reactive organic functional groups.

For example an aminofunctional organopolysiloxane containing pendant aminoalkyl groups such as —(CH$_2$)$_3$NH$_2$, —(CH$_2$)$_4$NH$_2$, —(CH$_2$)$_3$NH(CH$_2$)$_2$NH$_2$, or —CH$_2$CH(CH$_3$)CH$_2$NH(CH$_2$)$_2$NH$_2$ groups can be reacted with a less than stoichiometric amount of a compound or polymer containing at least two epoxide groups to effect partial crosslinking. Such an aminofunctional organopolysiloxane can also be reacted with an α,β-unsaturated carbonyl compound bearing the polyoxyalkylene group by a nucleophilic addition reaction. The α,β-unsaturated carbonyl compound can be an acrylate ester of a polyoxyalkylene glycol, for example an acrylate ester having the formula CH2=CH—COO-(A'-O)$_w$—(C$_2$H$_4$O)$_a$(C$_3$H$_6$O)$_b$(C$_4$H$_8$O)$_c$—R$^2$ where A', w, a, b, c and $R^2$ are defined as above. The aminofunctional organopolysiloxane can alternatively, after reaction with the compound or polymer containing at least two epoxide groups, be reacted with an epoxide-terminated polyether.

An organopolysiloxane containing pendant aminoalkyl groups, or hydroxyalkyl groups such as 2-hydroxyethyl, or carboxyl groups such as 3-methacryloxypropyl, can be reacted with a less than stoichiometric amount of a compound or polymer containing at least two isocyanate groups to effect partial crosslinking. The resulting organopolysiloxane can be reacted with an α,β-unsaturated carbonyl compound bearing the polyoxyalkylene group, an epoxide-terminated polyether or an isocyanate-terminated polyether. An organopolysiloxane containing carboxyl groups can be reacted with a polyoxyalkylene glycol.

The branched organopolysiloxane structure of the organopolysiloxane polyalkylene oxide copolymer can alternatively be derived from T-units of the formula RSiO$_{3/2}$ or Q-units of the formula SiO$_{4/2}$ in the organopolysiloxane. T-units can be bonded to three polysiloxane moieties, and Q-units can be bonded to three or four polysiloxane moieties, thus forming a branched organopolysiloxane structure. At least one, preferably more than one, of these polysiloxane moieties, has a polyoxyalkylene group of the formula

-A-O-(A'-O)$w$—(C$_2$H$_4$)$_a$(C$_3$H$_6$O)$_b$(C$_4$H$_8$O)$_c$—R$^2$ bonded thereto.

Thus branched organopolysiloxane polyalkylene oxide copolymers containing T-units have the formula R$_2$R*SiO(RR'SiO)$_x$(R$_2$SiO)$_y$(RR"SiO)$_z$Si R$_2$R*     (I)

wherein R, R', R*, x, y and z are as defined above and each R" represents an organopolysiloxane moiety. The organopolysiloxane polyalkylene oxide copolymer may for example have the general formula wherein R, R', R*, x, y and z are as defined in claim 2 and each $R^4$ represents a hydrocarbon group having 1 to 25 carbon atoms or a polyorganosiloxane group of the formula $R_2R^*SiO(RR'SiO)_{x'}(R_2SiO)_{y'}(RR''SiO)_{z'}$— wherein R, R', R", R* and y are as defined in claim 2, x'=0-10 and z'=0-5. Branched organopolysiloxane polyalkylene oxide copolymers containing Q-units do not have the formula (I) but have the formula $R_2R^*SiO(RR'SiO)_x(R_2SiO)_y(R''_2SiO)_zSiR_2R^*$ wherein R, R', R*, x, y and z are as defined above and each R" represents an organopolysiloxane moiety.

Branched organopolysiloxanes containing T-units and/or Q-units can be formed by hydrolysis and siloxane condensation of chlorosilanes of the formula $R_3SiCl$ and $RSiCl_3$ or $SiCl_4$, usually with chlorosilanes of the formula $R_2SiCl_2$. Such branched organopolysiloxanes generally contain Si—OH groups, and these may be reacted with a polyoxyalkylene glycol under strong acid or base catalysis to incorporate polyoxyalkylene groups in the branched organopolysiloxane. Alternatively a chlorohydrosilane of the formula $R_2HSiCl$, $RHSiCl_2$ and/or $HSiCl_3$ can be reacted with the chlorosilanes of the formula $RSiCl_3$ and $R_2SiCl_2$ to form a branched organopolysiloxane containing Si—H groups, and the Si—H groups can be reacted with a polyether containing an ethylenically unsaturated group under hydrosilylation conditions as described above.

Branched organopolysiloxanes containing T-units or Q-units can also be produced from organopolysiloxanes containing an alkyldihydroxysilyl terminal group, for example a bis(dihydroxy)-terminated polydimethylsiloxane. Such an organopolysiloxane can form a branched organopolysiloxane by a siloxane condensation reaction with itself or with a dialkoxysilane, trialkoxysilane or tetraalkoxysilane.

Alternatively, branched organopolysiloxanes containing T-units or Q-units and Si—H groups can be prepared by a rearrangement reaction between polysiloxanes containing at least one SiH group and branched polysiloxanes consisting of T-units and/or Q-units with M-units and/or D-units under strong acid catalysis. Optionally alkoxysilane, dihydroxy-terminated polydimethylsiloxane, or cyclosiloxane can be coreacted with the polysiloxane containing at least one SiH group and the branched polysiloxane. The resulting branched organopolysiloxane containing Si—H groups can be reacted with a polyether containing an ethylenically unsaturated group.

An alternative branched organopolysiloxane is based on tetrafunctional siloxane Q-units having the formula $SiO_{4/2}$ and monofunctional siloxane units which may be represented by the formulae $R_3SiO_{1/2}$ and $R'R_2SiO_{1/2}$, wherein R and R' are each defined as above. Preferably the ratio of tetrafunctional siloxane units to monofunctional siloxane units is 1:0.4-1.2. R preferably represents an alkyl group having 1 to 6 carbon atoms, and most preferably methyl. Difunctional and trifunctional siloxane units ($R_2SiO_{2/2}$ and $RSiO_{3/2}$, respectively) may also be included, but they are typically present at less than 10% for each unit. The total number of monofunctional siloxane units in the resin is preferably at least 20%, more preferably at least 30%, based on the total number of siloxane units. The resin is preferably prepared by cohydrolysing and condensing a mixture of $R_3SiCl$, $HR_2SiCl$ and $SiCl_4$ and then coupling an allyloxy-terminated polyoxyalkylene polymer with the aid of a platinum catalyst. The resin may also be obtained by reacting a resin containing the tetrafunctional siloxane units having the formula $SiO_{4/2}$ and monofunctional siloxane units having the formula $R_3SiO_{1/2}$ with a hydroxyl containing polyoxyalkylene polymer by heating a mixture of the two ingredients for about two hours at reflux, preferably in the presence of a siloxane condensation catalyst such as potassium hydroxide or tin octoate.

Branched organopolysiloxanes containing T-units and/or Q-units are branched without the need for any crosslinking. However they may be partially crosslinked to introduce further branching. For example a T-branched or Q-branched organopolysiloxane containing Si—H groups can be reacted with a small amount of a compound of the formula $CH_2=CR^3—Y—CR^3=CH_2$, wherein each $R^3$ represents hydrogen or an alkyl group having 1 to 3 carbon atoms and Y represents an organic or organosiloxane linkage which contains no hydrolysable bonds, before being reacted with a polyether containing an ethylenically unsaturated group, both reactions being carried out under hydrosilylation conditions.

The branched organopolysiloxane polyalkylene oxide copolymer composition, however prepared, preferably has a viscosity of less than 50000 mPa·s, more preferably less than 30000 mPa·s at 25° C. The branched organopolysiloxane polyalkylene oxide copolymer composition may for example have a viscosity in the range from 100 mPa·s to less than 25000 mPa·s at 25° C.

The branched organopolysiloxane polyalkylene oxide copolymer, or the branched organopolysiloxane polyalkylene oxide copolymer composition prepared as reaction product, is added to the suspension of solid material in water before the suspension is drained. In general the organopolysiloxane polyalkylene oxide copolymer can be added at any convenient point. The branched organopolysiloxane polyalkylene oxide copolymer composition is usually dispersible in water and can for example be added as a preformed aqueous dispersion. Such a dispersion can for example contain 2 to 50% by weight of the branched organopolysiloxane polyalkylene oxide copolymer composition (0.2 to 50% by weight of the branched organopolysiloxane polyalkylene oxide copolymer itself.) Alternatively undiluted branched organopolysiloxane polyalkylene oxide copolymer composition can be added to a liquid medium such as a wash liquor or to a slurry.

The branched organopolysiloxane polyalkylene oxide copolymer composition improves the drainage rate of suspensions of solid material in a variety of industries and processes.

For example, in a process for producing dry washed wood pulp by washing wood pulp in an aqueous slurry and draining and drying the washed wood pulp slurry, the branched organopolysiloxane polyalkylene oxide copolymer composition can be added to the wood pulp or to the wash medium before washing, or to the mixture of wood pulp and wash liquor before it is agitated in the washing step, or after washing and before draining.

In a laundry process comprising washing textile material in an aqueous detergent solution and rinsing the washed textile material with water, the branched organopolysiloxane polyalkylene oxide copolymer composition can be added to the aqueous detergent solution used for washing the textile at the start of the laundry process, or to the rinse water at the start of the rinse step of the laundry process.

In a coal washing process, the branched organopolysiloxane polyalkylene oxide copolymer composition can be added to the water used for coal washing or to the suspension of fine coal produced during washing.

In sewage treatment, the branched organopolysiloxane polyalkylene oxide copolymer composition, preferably in the form of an aqueous dispersion, can be added to the sludge as it is fed to a settling tank.

The branched organopolysiloxane polyalkylene oxide copolymer composition prepared as reaction product can be added to the suspension of solid material at a concentration of 0.01 to 5000 parts per million based on the weight of suspended solid material. We have found that the branched organopolysiloxane polyalkylene oxide copolymer is effective in improving drainage even at a very low concentration such as 0.01 to 50 parts per million branched organopolysiloxane polyalkylene oxide copolymer composition based on the weight of suspended solid material, which may be as low as 0.001 to 50 parts per million of the branched organopolysiloxane polyalkylene oxide copolymer itself.

The branched organopolysiloxane polyalkylene oxide copolymer can if desired be mixed with another fluid silicone, for example a polydimethylsiloxane fluid. Such a fluid silicone can for example have a viscosity in the range 20 to 20000 cSt at 25° C. The fluid silicone may contain Si-bonded groups other than methyl, for example other alkyl groups, aryl groups, aralkyl groups, or silanol groups. The fluid silicone if used can for example be present at 1 to 200% by weight based on the branched organopolysiloxane polyalkylene oxide copolymer.

The branched organopolysiloxane polyalkylene oxide copolymer can have a solid material, for example finely divided silica, dispersed therein, although the branched organopolysiloxane polyalkylene oxide copolymer is effective in improving drainage without any dispersed solid therein.

The branched organopolysiloxane polyalkylene oxide copolymer drainage aid can be used in conjunction with other additives. For example in a process for washing wood pulp it can be used in conjunction with an antifoam. The antifoam can for example be a branched polydimethylsiloxane fluid or a polydiorganosiloxane containing methyl aralkyl siloxane units. The branched organopolysiloxane polyalkylene oxide copolymer may or may not improve the antifoam performance, and may have some foam inhibiting properties itself even in the absence of an antifoam additive. However we have found that the organopolysiloxane polyallylene oxide copolymer comprising a branched organopolysiloxane structure improves the drainage of a suspension compared to an unbranched organopolysiloxane polyalkylene oxide copolymer irrespective of whether or not it has foam inhibiting properties or improves the foam inhibiting properties of an added antifoam. This improved drainage performance is independent of the defoaming and antifoaming capabilities of the branched silicone polyethers.

When used in the absence of an antifoam, the preferred concentration may for example be in the range 0.1 to 100 parts per million branched organopolysiloxane polyalkylene oxide copolymer composition as prepared based on the weight of wood pulp fibres when the branched organopolysiloxane polyalkylene oxide copolymer is used in pulp washing. Higher concentrations, for example up to 5000 parts per million, may be used when the branched organopolysiloxane polyalkylene oxide copolymer composition is used in improving drainage of textiles in a laundry process or textile manufacturing process. When used with an antifoam, the branched organopolysiloxane polyalkylene oxide copolymer composition can for example be added as 0.5 to 10% of an antifoam composition, and at 0.05 to 10 parts per million branched organopolysiloxane polyalkylene oxide copolymer composition based on the weight of suspended solid material. Even at these very low levels, the branched organopolysiloxane polyalkylene oxide copolymer improves drainage compared to an antifoam composition containing a non-branched organopolysiloxane polyalkylene oxide copolymer.

In pulp and paper applications, improved drainage allows reduced fresh water consumption and reduced drying energy. A chemical process for wood pulp production comprises the steps of heating wood chips in an aqueous cooking liquor containing for example sodium hydroxide and sodium sulfide to form a first wood pulp slurry, depositing the wood pulp slurry on a screen to form an initial pulp layer, washing the initial pulp layer thus deposited with an aqueous wash liquor containing for example caustic soda and fatty acid to form a second wood pulp slurry, and draining and drying this washed wood pulp slurry. We have found that addition of an organopolysiloxane polyalkylene oxide copolymer comprising a branched organopolysiloxane structure to the aqueous wood pulp slurry in the washing step before draining increases the rate of drainage of the wood pulp slurry and reduces the total energy used in draining and drying the slurry. The branched organopolysiloxane polyalkylene oxide copolymer can be added at any stage in the washing step before draining. It can for example be added to the pulp entering the washing step, or to the aqueous wash liquor, or to the washed wood pulp slurry before draining. Improved drainage in the pulp washing process also results in a cleaner pulp that requires decreased usage in bleaching chemicals as well as reduced fresh water consumption and reduced drying energy. Addition of an organopolysiloxane polyalkylene oxide copolymer comprising a branched organopolysiloxane structure to the first aqueous wood pulp slurry after heating and before draining also gives some improvement in draining of wash liquor through the washed pulp layer in a subsequent washing step.

The improved drainage can be measured as an increased rate of drainage against time or as an increased consistency of the solid material after draining for a fixed period of time. For example, the weight of filtrate liquid removed from the suspension, or the weight of filtrate liquid washed through a pulp layer which has been deposited from a slurry to which the branched organopolysiloxane polyalkylene oxide copolymer has been added, can be measured continuously and plotted against time; the drainage rate is the slope of the graph of filtrate weight against time. Alternatively, the weight of the wet solid after a fixed time of drainage can be measured; a lower weight of wet solid indicates a higher consistency of the wet solid residue and improved drainage. By either measure, the organopolysiloxane polyalkylene oxide copolymer comprising a branched organopolysiloxane structure improves the drainage of a suspension compared to an unbranched organopolysiloxane polyalkylene oxide copolymer.

The invention is illustrated by the following Examples, in which parts and percentages are by weight unless otherwise stated and viscosities are measured at 25° C. The Examples are described with reference to FIG. 1 of the accompanying drawings, which is a graph plotting filtrate weight against time during drainage tests in each of the Examples.

Example 1

1 mole of a Si—H functional organopolysiloxane of the formula $MD_{108}D^H{}_{10}M$, where M represents a $(CH_3)_3Si$— group, D represents a $(CH_3)_2SiO$ siloxane unit and $D^H$ represents a $(CH_3)HSiO$ siloxane unit, was reacted with 0.27 moles of a vinyl-terminated polydimethylsiloxane of viscosity 350 cSt having a degree of polymerisation of about 150 siloxane units at 40° C. for 1 hour in the presence of a chloroplatinum acid catalyst to produce an organopolysiloxane branched by partial crosslinking. This branched organopolysiloxane was reacted with 15 moles of an allyl polyglycol ether of the formula $CH_2\!=\!CH\!-\!CH_2\!-\!O\!-\!(C_2H_4O)_{18}\!-\!(C_3H_6O)_{18}\!-\!H$ at 80° C. in the presence of sodium acetate and isopropanol while monitoring the reaction rate of the Si—H to produce a branched silicone polyether copolymer of viscosity 20000 mPa·s after the solvent was removed. The branched silicone polyether copolymer was diluted with water to form a 10% aqueous dispersion.

A dispersion of pulp at 3.5% consistency was prepared from pulp slurry sampled from a pulp manufacturing plant and a solution containing 2.75% caustic soda and 0.25% fatty acids that is used to simulate the pulp washing process liquor. This dispersion, which simulates the pulp slurry entering a pulp washer, was held at 80° C. for 12 hours to condition the pulp. 5 mg of the 10% aqueous dispersion of the branched silicone polyether copolymer prepared above was mixed into 800 g of this pulp dispersion. The pulp dispersion was thickened under vacuum for 40 seconds and 600 ml of a solution containing 2.75% caustic soda and 0.25% fatty acids that is used to simulate the pulp washing process liquor was added at the top of the pulp mat and drained through it under vacuum at 80° C.

The filtration liquid was collected on a continually recording weighing machine. A graph was plotted of filtrate weight against time; this graph is shown as line E1 on FIG. 1. As can be seen, the graph is a straight line over the period in which 10% to 70% of the filtrate was collected. The slope of the graph was measured to give a drainage rate in g/sec; this is recorded in Table 1.

After 150 seconds vacuum drainage was stopped and the consistency of the pulp residue was measured. This is recorded in Table 1.

Comparative Example 1

A non-branched silicone polyether copolymer of the formula $MD_{108}D'_{10}M$, where M and D have the meanings given in Example 1 and D' represents a $CH_3R'SiO$ siloxane unit in which R' is a $-(CH_2)_3-O-(C_2H_4O)_{18}-(C_3H_6O)_{18}-H$ polyether group was added to a pulp dispersion and tested as described in Example 1. The non-branched silicone polyether copolymer had a viscosity of 2500 mPa·s. The results are shown in Table 1 and as line C1 on FIG. 1.

Example 2

1 mole of a Si—H functional organopolysiloxane of the formula $MD_{13}D^H{}_{5.5}M$, where M represents a $(CH_3)_3Si$— group, D represents a $(CH_3)_2SiO$ siloxane unit, and $D^H$ represents a $(CH_3)HSiO$ siloxane unit, was reacted with 0.20 moles of a vinyl-terminated polydimethylsiloxane of viscosity 60 cSt having a degree of polymerisation of about 40 siloxane units at 40° C. for 1 hour in the presence of the platinum catalyst of Example 1 to produce an organopolysiloxane branched by partial crosslinking. This branched organopolysiloxane was reacted with 8 moles of an allyl polyglycol ether of the formula $CH_2\!=\!CH\!-\!CH_2\!-\!O\!-\!(C_2H_4O)_9\!-\!(C_3H_6O)_{27}\!-\!H$ at 80° C. in the presence of sodium acetate and isopropanol while monitoring the reaction rate of the Si—H to produce a branched silicone polyether copolymer of viscosity 3000 mPa·s after the solvent was removed.

The branched silicone polyether copolymer was diluted with water to form a 10% aqueous dispersion and added to a pulp dispersion and tested as described in Example 1. The results are shown as line E2 on FIG. 1 and in Table 1.

Comparative Example 2

A non-branched silicone polyether copolymer of the formula $MD_{13}D'_{5.5}M$, where M and D have the meanings given in Example 2 and D' represents a $CH_3R'SiO$ siloxane unit in which R' is a $-(CH_2)_3-O-(C_2H_4O)_9-(C_3H_6O)_{27}-H$ polyether group was added to a pulp dispersion and tested as described in Example 1. The results are shown as line C2 on FIG. 1 and in Table 1.

Example 3

A branched polysiloxane of the average formula $MT_{1.9}D_{21.2}D^H{}_{5.3}M$, where M, D and $D^H$ have the meanings given in Example 1 and T is a $CH_3SiO_{3/2}$ siloxane unit was reacted with an unsaturated polyether of the formula $CH_2\!=\!CH\!-\!CH_2\!-\!O\!-\!(C_2H_4O)_9\!-\!(C_3H_6O)_{27}\!-\!H$ at 80° C. in the presence of the platinum catalyst of Example 1, sodium acetate, and isopropanol while monitoring the reaction rate of the Si—H to produce a branched silicone polyether copolymer of viscosity 5600 mPa·s after the solvent was removed.

The branched silicone polyether copolymer was diluted with water to form a 10% aqueous dispersion and was added to a pulp dispersion and tested as described in Example 1. The results are shown as line E3 on FIG. 1 and in Table 1.

Example 4

Example 2 was repeated with the variation that the allyl polyglycol ether used had the formula $CH_2\!=\!CH\!-\!CH_2\!-\!O\!-\!(C_2H_4O)_{18}\!-\!(C_3H_6O)_{18}\!-\!H$ as used in Example 1. The branched silicone polyether copolymer produced was diluted with water and tested as described in Example 1. The results are shown as line E4 on FIG. 1 and in Table 1.

Example 5

1 mole of the Si—H functional organopolysiloxane of Example 2 was reacted with 0.20 moles of the vinyl-terminated polydimethylsiloxane of viscosity 350 cSt used in Example 1 at 40° C. for 1 hour in the presence of the platinum catalyst of Example 1 to produce an organopolysiloxane branched by partial crosslinking. This branched organopolysiloxane was reacted with 8 moles of an allyl polyglycol ether of the formula $CH_2\!=\!CH\!-\!CH_2\!-\!O\!-\!(C_2H_4O)_9\!-\!(C_3H_6O)_{27}\!-\!H$ at 80° C. in the presence of sodium acetate and isopropanol while monitoring the reaction rate of the Si—H to produce a branched silicone polyether copolymer of viscosity 2400 mPa·s after the solvent was removed. The branched silicone polyether copolymer produced was diluted with water and tested as described in Example 1. The results are shown as line E5 on FIG. 1 and in Table 1.

TABLE 1

| Example | Branched silicone polyether viscosity (mPa · s) | Drainage rate (g/sec) | Pulp consistency after 150 s drainage |
|---|---|---|---|
| Comparative 1 | 2 500 | 3 | 11% |
| Example 1 | 20 000 | 5 | 18% |
| Comparative 2 | 1 200 | 5 | 17% |
| Example 2 | 3 000 | 7 | 20% |
| Example 3 | 5 600 | 7 | 18% |
| Example 4 | 2 700 | 4 | 14% |
| Example 5 | 2 400 | 10 | 18% |

Figure 1:
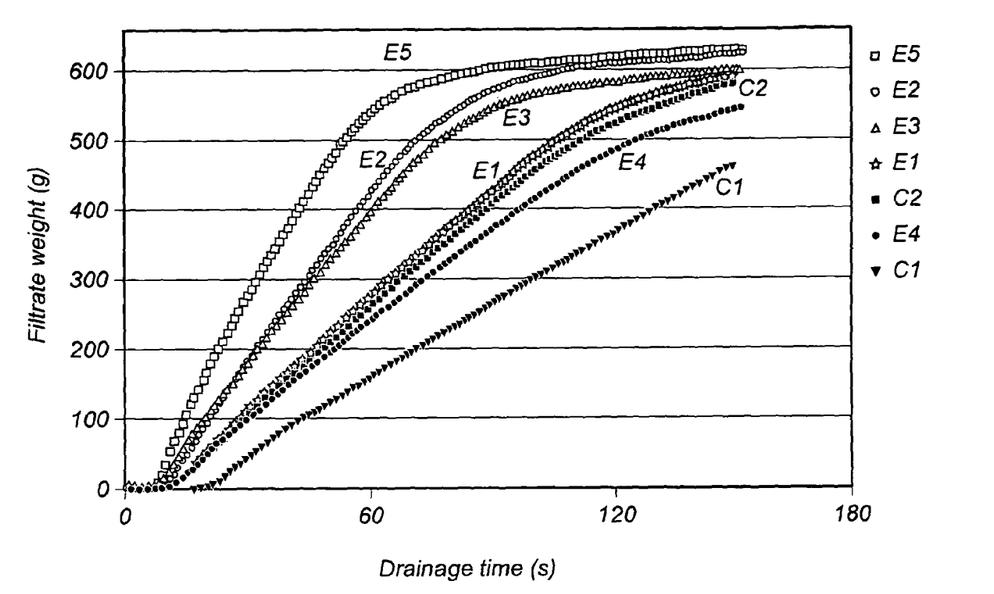

It can be seen from FIG. 1 and Table 1 that the branched silicone polyether copolymer of Example 1 gave substantially better drainage of the pulp dispersion than the non-branched silicone polyether copolymer of Comparative example 1, both measured by drainage rate and as measured by pulp residue consistency. Similarly the branched silicone polyether copolymer of Example 2 gave substantially better drainage of the pulp dispersion than the non-branched silicone polyether copolymer of Comparative example 2 by both measures.

It can also be seen from FIG. 1 and Table 1 that the branched silicone polyether copolymers containing a polyoxypropylene-rich polyether chain gave better drainage than the branched silicone polyether copolymers in which the polyether groups contained equimolar amounts of polyoxyethylene and polyoxypropylene. The branched silicone polyether copolymer of Example 5 gave a substantially better drainage rate of the pulp dispersion than the branched silicone polyether copolymer of Example 1. Similarly the branched silicone polyether copolymer of Example 2 gave substantially better drainage of the pulp dispersion than the branched silicone polyether copolymer of Example 4.

Example 6

6 mole of poly (methylhydrogen) cyclic siloxane having an average Dp of about 4.4 and 1 mole of the vinyl-terminated polydimethylsiloxane of viscosity 350 cSt and having an averaged degree of polymerization of 150 used in Example 1 were reacted at 50° C. for 2.5 hours in the presence of a platinum divinyl tetramethyl disiloxane complex and toluene to produce an organopolysiloxane branched by partial crosslinking. After stripping of the organopolysiloxane at 95° C. of unreacted poly (methylhydrogen) cyclic siloxane and toluene and cooling, 0.006 mole of diallyl maleate was added. This branched organopolysiloxane had a SiH level of 0.072 wt % (SiH as H) as determined by titration. It was reacted at 80° C. for 4 hours with an allyl polyglycol ether of the formula $CH_2$=CH—$CH_2$—O—$(C_2H_4O)_9$—$(C_3H_6O)_{27}$—H, where Vi group/SiH group moler ratio was 1.2, in the presence of the platinum catalyst of Example 1, sodium acetate, and isopropanol. After the solvent was removed, a branched silicone polyether copolymer of viscosity 13800 mPa·s was produced.

The branched silicone polyether copolymer produced was diluted with water and tested as described in Example 1. The drainage profile obtained for the Example 6 branched silicone polyether copolymer was similar to the profile E4 shown in FIG. 1.

The invention claimed is:

1. A process for separating a solid material from a suspension of the solid material in water, said process comprising:

adding to the suspension of solid material in water an organopolysiloxane polyalkylene oxide copolymer having the general formula $$R_2R^*SiO(RR'SiO)_x(R_2SiO)_y(RR''SiO)_zSiR_2R^* \quad (I)$$

wherein each R represents a hydrocarbon group having 1 to 25 carbon atoms;

each R' represents a polyoxyalkylene group of the formula $$-A-O-(A'-O)_w—(C_2H_4O)_a(C_3H_6O)_b(C_4H_8O)_c—R^2$$

wherein A represents a divalent hydrocarbon group having 1 to 20 carbon atoms, an acylalkyl group of the formula -A"C(O)— where A" is an alkylene group having 2 to 4 carbon atoms, or a direct bond to Si, A' represents an alkylene group having 2 to 5 carbon atoms, $R^2$ represents a hydrogen atom, an alkyl group having 1 to 20 carbon atoms or an acyl group having 1 to 20 carbon atoms, w=0 or 1, a=0-50, b=0-50 and c=0-20, provided that a+b+c is at least 1; each R" represents an organopolysiloxane moiety or an organic group substituted by an organopolysiloxane moiety and is bonded to Si by a Si—C bond or a siloxane linkage; each R* is a R, R' or R" group; x=1-40; y=0-300; and z=1-5;

mixing the organopolysiloxane polyalkylene oxide copolymer and the suspension of solid material in water to form a mixture; and draining the solid material from the mixture;

wherein the organopolysiloxane polyalkylene oxide copolymer comprising a branched organopolysiloxane structure increases the rate of drainage of the suspension.

2. The process according to claim 1, wherein the solid material is fibrous cellulosic material.

3. The process according to claim 2, further defined as a process for producing dry washed wood pulp, wherein the solid material is washed wood pulp and the suspension is the washed wood pulp and an aqueous slurry.

4. The process according to claim 1, wherein b=5-40, c=0 and b is greater than a.

5. The process according to claim 1, wherein the organopolysiloxane moiety comprising R" is substituted by at least one polyoxyalkylene group.

6. The process according to claim 1, wherein the organopolysiloxane polyalkylene oxide copolymer has the general formula wherein R, R', R*, x, y and z are as defined above; each $R^3$ represents hydrogen or an alkyl group having 1 to 3 carbon atoms and Y represents an organic or organosiloxane linkage which contains no hydrolysable bonds.

7. The process according to claim 1, wherein the organopolysiloxane polyalkylene oxide copolymer has the general formula wherein R, R', R*, x, y and z are as defined above and each $R^4$ represents a hydrocarbon group having 1 to 25 carbon atoms or a polyorganosiloxane group of the formula wherein R, R', R", R* and y are as defined above, x'=0-10 and z'=0-5.

8. The process according to claim 1, wherein the organopolysiloxane polyalkylene oxide copolymer has the general formula wherein R is defined above; each $R^5$ represents a hydrocarbon group having 1 to 25 carbon atoms, a polyoxyalkylene group of the formula wherein A represents a divalent hydrocarbon group having 1 to 20 carbon atoms or an acylalkyl group of the formula -A"C(O)— where A" is an alkylene group having 2 to 4 carbon atoms, A' represents an alkylene group having 2 to 5 carbon atoms, $R^2$ represents a hydrogen atom, an alkyl group having 1 to 20 carbon atoms or an acyl group having 1 to 20 carbon atoms, w=0 or 1, a=0-50, b=0-50 and c=0-20, provided that a+b+c is at least 1, or an organopolysiloxane moiety or organic group substituted by an organopolysiloxane moiety which is bonded to Si by a Si—C bond, provided that at least one group $R^5$ represents a polyoxyalkylene group and at least one group $R^5$ represents an organopolysiloxane moiety or organic group substituted by an organopolysiloxane moiety; n=1-400; and each q=1 or 2.

9. The process according to claim 1, wherein the branched organopolysiloxane polyalkylene oxide copolymer is present as part of a composition also containing organopolysiloxane polyalkylene oxide copolymer having the general formula $R_2R^*SiO(RR'SiO)_x(R_2SiO)_y(RR"SiO)_zSiR_2R^*$    (I)

wherein each R represents a hydrocarbon group having 1 to 25 carbon atoms; each R' represents a polyoxyalkylene group of the formula -A-O-(A'-O)$_w$—(C$_2$H$_4$O)$_a$(C$_3$H$_6$O)$_b$(C$_4$H$_8$O)$_c$—R$^2$ wherein A represents a divalent hydrocarbon group having 1 to 20 carbon atoms, an acylalkyl group of the formula -A"C(O)— where A" is an alkylene group having 2 to 4 carbon atoms, or a direct bond to Si, A' represents an alkylene group having 2 to 5 carbon atoms, $R^2$ represents a hydrogen atom, an alkyl group having 1 to 20 carbon atoms or an acyl group having 1 to 20 carbon atoms, w=0 or 1, a=0-50, b=0-50 and c=0-20, provided that a+b+c is at least 1; each R" represents an organopolysiloxane moiety or an organic group substituted by an organopolysiloxane moiety and is bonded to Si by a Si—C bond or a siloxane linkage; each R* is a R, R' or R" group; x=1-40; y=0-300; and z=0, the average value of z in the total organopolysiloxane polyalkylene oxide copolymer in the composition being in the range 0.1 to 2.

10. The process according to claim 9, wherein the composition has a viscosity of less than 30000 cSt at 25° C.

11. The process according to claim 1, wherein the solid material is coal.

12. The process according to claim 1, wherein the solid material is sewage sludge.

13. A process for improving the drainage of a suspended solid material from an aqueous medium, said process comprising adding an organopolysiloxane polyalkylene oxide copolymer comprising a branched organopolysiloxane structure to the aqueous medium, said branched organopolysiloxane polyalkylene oxide copolymer having the general formula $R_2R^*SiO(RR'SiO)_x(R_2SiO)_y(RR"SiO)_zSiR_2R^*$    (I)

wherein each R represents a hydrocarbon group having 1 to 25 carbon atoms; each R' represents a polyoxyalkylene group of the formula -A-O-(A'-O)$_w$—(C$_2$H$_4$O)$_a$(C$_3$H$_6$O)$_b$(C$_4$H$_8$O)$_c$—R$^2$ wherein A represents a divalent hydrocarbon group having 1 to 20 carbon atoms, an acylalkyl group of the formula -A"C(O)— where A" is an alkylene group having 2 to 4 carbon atoms, or a direct bond to Si, A' represents an alkylene group having 2 to 5 carbon atoms, $R^2$ represents a hydrogen atom, an alkyl group having 1 to 20 carbon atoms or an acyl group having 1 to 20 carbon atoms, w=0 or 1, a=0-50, b=0-50 and c=0-20, provided that a+b+c is at least 1; each R" represents an organopolysiloxane moiety or an organic group substituted by an organopolysiloxane moiety and is bonded to Si by a Si—C bond or a siloxane linkage; each R* is a R, R' or R" group; x=1-40; y=0-300; and z=1-5.

14. A laundry process comprising washing textile material in an aqueous detergent solution and rinsing the washed textile material with water, wherein the aqueous detergent solution or the water comprises an organopolysiloxane polyalkylene oxide copolymer having the general formula $R_2R^*SiO(RR'SiO)_x(R_2SiO)_y(RR"SiO)_zSiR_2R^*$    (I)

wherein each R represents a hydrocarbon group having 1 to 25 carbon atoms; each R' represents a polyoxyalkylene group of the formula -A-O-(A'-O)$_w$—(C$_2$H$_4$O)$_a$(C$_3$H$_6$O)$_b$(C$_4$H$_8$O)$_c$—R$^2$ wherein A represents a divalent hydrocarbon group having 1 to 20 carbon atoms, an acylalkyl group of the formula -A"C(O)— where A" is an alkylene group having 2 to 4 carbon atoms, or a direct bond to Si, A' represents an alkylene group having 2 to 5 carbon atoms, $R^2$ represents a hydrogen atom, an alkyl group having 1 to 20 carbon atoms or an acyl group having 1 to 20 carbon atoms, w=0 or 1, a=0-50, b=0-50 and c=0-20, provided that a+b+c is at least 1; each R" represents an organopolysiloxane moiety or an organic group substituted by an organopolysiloxane moiety and is bonded to Si by a Si—C bond or a siloxane linkage; each R* is a R, R' or R" group; x=1-40; y=0-300; and z=1-5.

15. The process according to claim 3, further comprising washing wood pulp in the aqueous slurry to form the suspension and drying the washed wood pulp after draining the washed wood pulp from the mixture.

16. The process according to claim 15, wherein the organopolysiloxane polyalkylene oxide copolymer is added to the aqueous slurry before draining the washed wood pulp from the mixture, thereby increasing the rate of drainage and reducing the total energy used in draining and drying of the washed wood pulp.

* * * * *